May 10, 1949. R. J. WOODS 2,469,488
FLUTTER DAMPENER
Filed Oct. 23, 1945 2 Sheets-Sheet 1

INVENTOR
ROBERT J. WOODS
BY
Bean, Brooks, Buckley & Bean. ATTORNEYS

May 10, 1949.  R. J. WOODS  2,469,488
FLUTTER DAMPENER
Filed Oct. 23, 1945  2 Sheets-Sheet 2

INVENTOR
ROBERT J. WOODS
BY
Bean, Brooks, Buckley & Bean ATTORNEYS

Patented May 10, 1949

2,469,488

UNITED STATES PATENT OFFICE 2,469,488

FLUTTER DAMPENER

Robert J. Woods, Grand Island, N. Y., assignor to Bell Aircraft Corporation, Wheatfield, N. Y.

Application October 23, 1945, Serial No. 624,038

2 Claims. (Cl. 188—93).

My invention relates in general to dampening devices for use upon airplanes, and in particular to devices for dampening oscillations and thereby eliminating possibility of flutter of adjustable airplane parts such as the ailerons, elevators, wing flaps, and the like.

The principal object of my invention has been to provide an improved device for pivotally mounting an aircraft control surface such as an elevator, or wing flap, or aileron of an airplane, combined with an improved dampening device for stabilizing such members and eliminating flutter thereof during flight.

Another object has been to provide an improved flutter dampening device having means for regulating the fluid orifices thereof in accordance with the fluid viscosity variations due to temperature changes.

Moreover, my device incorporates means for easily and quickly aligning the fixed and movable airplane parts when being assembled.

Furthermore, the invention employs an arrangement of fixed and movable brackets in straddled relation, thereby providing a device of the character described which is of improved structural simplicity and ruggedness.

The above objects and advantages have been accomplished by the device shown in the accompanying drawings, of which:

Figure 1:
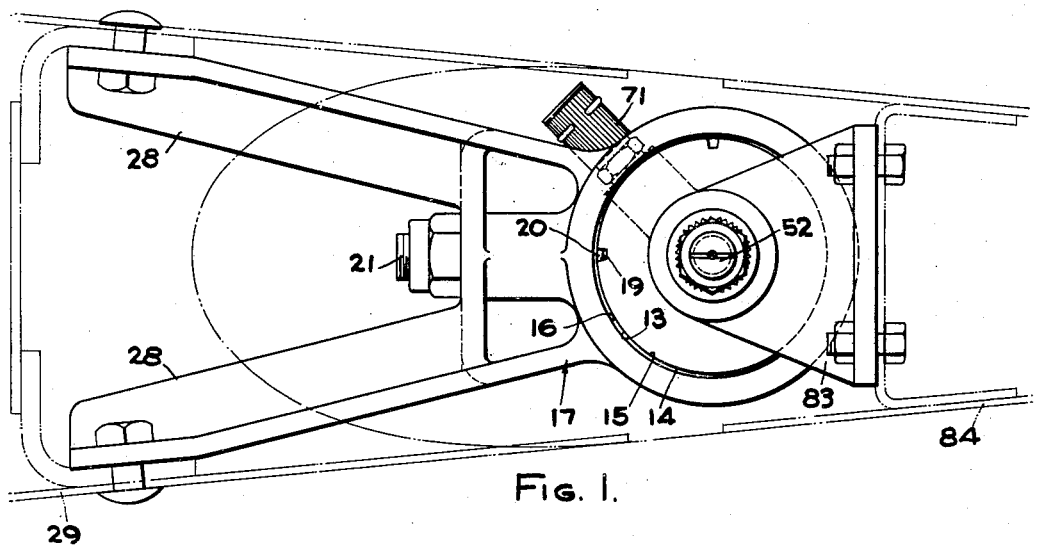
Fig. 1 is a side elevation of my device showing it in the position occupied when attached to airplane parts.
Figure 2:
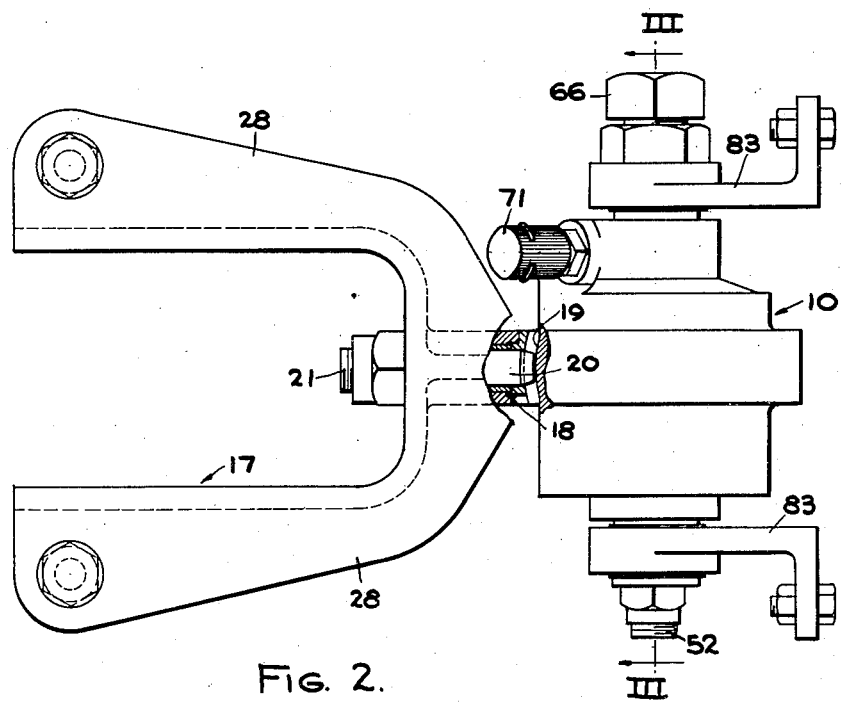
Fig. 2 is a plan view of the device.
Figure 3:
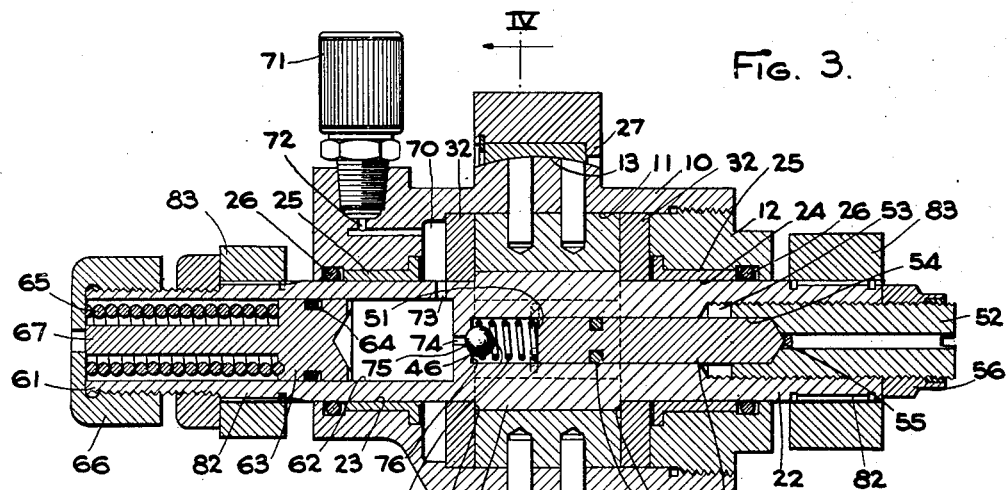
Fig. 3 is a sectional elevation of the device taken on line III—III of Fig. 2.
Figure 4:
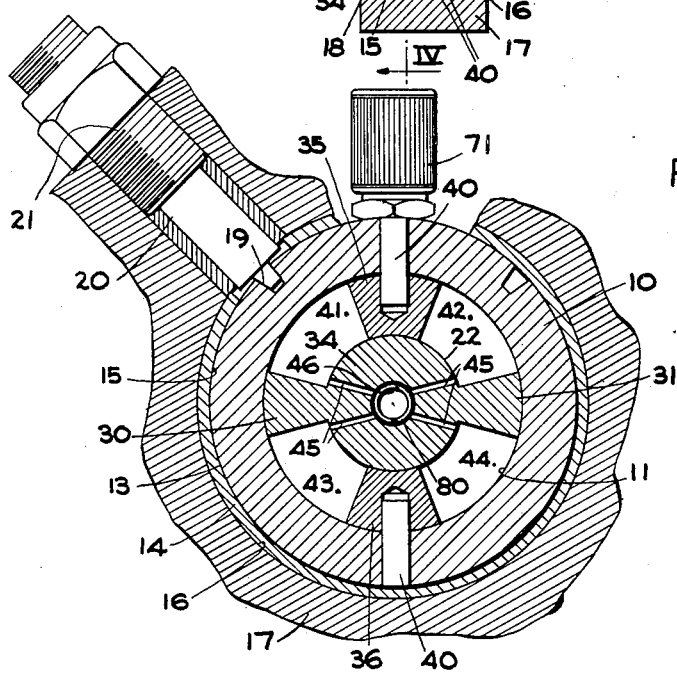
Fig. 4 is a transverse fragmentary sectional view taken on line IV—IV of Fig. 3.

The device comprises a housing 10 having a centrally arranged bore 11 extending from one end thereof and closed by means of a plug 12, screw-threaded into the end of the bore. The exterior of the housing is formed in part with a substantially spherical surface about which is placed a split ring 14 having an engaging spherical surface 15. This ring is mounted in a suitable bore 16 formed in the fixed bracket 17 where it is held against a shoulder 27 by means of a ring retainer 18. A keyway 19 is formed in the spherical portion of the housing, and a key pin 20 engages this keyway. The pin is forced into locking position by means of a lock screw 21. The key pin thereby not only keeps the housing from turning relatively with the bracket, but also serves to lock the bracket in its spherical adjustment. The bracket is provided with arms 28 which extend rearwardly and which are attached by suitable means to the stabilizer or other fixed part 29 of the airplane structure.

The device is provided with an oscillating shaft 22 mounted in one end of the casing within a suitable bearing 23 and at its opposite end within a bearing 24 provided in the plug 12. A suitable bushing 25 forms part of each of these bearings and the device is sealed at each end by means of suitable packings 26. The shaft 22 is provided with two oppositely arranged movable vanes 30 and 31 which are mounted within the bore 11 of the housing. Disks 32 are mounted within the housing to encircle the shaft, one at each end of the movable vanes. Each disk is positioned against a shoulder 33 formed by a shaft enlargement 34, which is preferably coextensive with said movable vanes. The plug 12 which is adjustable serves to hold the disks in the proper relationship with the vanes. Fixed vanes 35 and 36 are mounted within the bore 11 of the housing and engage the outer periphery of the enlarged surface 34 of the shaft. These fixed vanes are held in place by means of pins 40 extending through the housing and into the vanes. Working chambers 41, 42, 43, and 44 are thus provided within the housing 10 between the coacting movable and fixed vanes. Suitable passageways 45 are formed in the enlarged portion 34 of the shaft and serve to connect the working chambers with each other through a centrally arranged bore 46 formed axially through the shaft 22, whereby fluid will be permitted to pass from one chamber to another, as will hereinafter be described.

Mounted within the bore 46 of the shaft is a thermostatic rod 50, made of a material which has a different coefficient of expansion than that of the shaft, so that under varying temperature conditions the rod will expand and contract axially with relation to the shaft. The end 51 of this rod is arranged adjacent the open ends of the passageways 45 where they enter the bore 46, whereby under conditions of expansion the end of the rod will partly close the passageways, thereby restricting the flow of fluid therethrough. This rod is carried by an adjusting screw 52 which is mounted within a suitable screw-threaded bore 53 formed in one end of the shaft 22, whereby the axial position of the thermostatic rod with respect to the passageways 45 may be adjusted. So as to assure movement of the rod with the screw 52, the end of the rod is fixedly mounted within a bore 54 formed in the end of the screw, and it is preferably secured to that screw by means of soldering or pining at 55. A lock nut 56 serves to retain the screw and the rod in their adjusted positions. Suitable packing means 60 are carried by the rod for sealing it within the bore against leakage of fluid.

The opposite end 61 of the shaft is formed with a centrally arranged bore 62 within which is mounted a plunger 63, suitable packing means 64 being provided to seal the joint therebetween. The plunger is provided with an outwardly extending stem 67 about which a helical spring 65 is disposed. The exterior surface of the shaft is screw-threaded and mounted upon it is a nut 66 which serves to close the end of the bore 62 in the shaft and to retain the spring in its compressed condition. The end of the housing adjacent the end 61 of the shaft is formed with a reservoir 70 provided preferably by the space between the housing and the disk 32. A filler plug 71 is carried by the housing and a suitable passageway 72 connects the opening of this plug with the reservoir, whereby fluid used in the device may be replenished. The reservoir 70 is connected to the bore 62 of the shaft by means of a port 73, and the bore 62 is connected to the bore 46 by means of a port 74. Passage of fluid through the port 74 is checked in one direction by means of a ball valve 75 which is held against its seat formed by the end wall 76 of the bore 46 by means of a helical spring 80, whereby fluid within the working chambers of the device will not be permitted to pass through the port 74, but when leakage of fluid from said chamber occurs, fluid will be permitted to pass from said reservoir into said bore 46 and to said chambers to thereby replenish the loss.

The shaft 22 extends beyond the casing at each end thereof and a serrated portion 82 is formed at each of such ends. A movable bracket 83 is engaged in a non-rotative relationship with each of such serrated portions of the shaft and is suitably attached to the movable control surface 84 of the airplane.

From the foregoing it will be clear that any fluttering action of the surface 84 will tend to cause oscillating movement of the shaft 22 within the housing 10, thereby tending to cause the movable vanes 30 and 31 to move back and forth within the working chambers 41, 42, 43, and 44. This forces the fluid to flow from the chamber of decreasing capacity to the chamber of increasing capacity through the restricted passageway, and the resistance to such fluid flow dampens the action of the control surface. When, for example under high temperature conditions, the viscosity of the fluid is reduced, the thermostatic rod 50 will be changed in length to partly close the orifices 45, thereby maintaining substantially the same resistance offered to the passage of fluid during the dampening action of the device under all temperature conditions. Should excessive leakage of the fluid from the working chambers occur from any cause, the pressure balance of the fluid between the reservoir and the working chambers will be disturbed and fluid will therefore flow from the reservoir through the port 74 to the bore 46, thereby replenishing such loss. When the loss has been replenished, the ball valve 75 will again seat and thus close off the port 74 against reverse passage of fluid.

From the foregoing it will be clear that my device provides not only a suitable hinge connection for the aileron or other movable airplane control surface but also combines with the hinge connection suitable dampening means. When assembling the device upon the airplane, the brackets after having been secured to their engaged surfaces, may be conveniently aligned by reason of the spherical connection between the housing and the fixed bracket 17 and secured in such position by means of lock screw 21 and key pin 20.

What is claimed is:

1. A flutter dampener for attachment to relatively oscillating parts comprising a housing having a spherically-shaped periphery, a shaft mounted within the housing for oscillation relative thereto, a first bracket securing one of said parts to said shaft, a second bracket secured to the other of said parts and pivotally movable relative to said housing in a plane substantially parallel to the axis of said shaft to permit initial alignment of said brackets with said parts, a radially movable key pin non-rotatively carried by said second bracket and movable toward the spherically-shaped periphery of said housing, and means for locking said pin to said housing.

2. A flutter dampener for attachment to relatively oscillating parts comprising a housing having a spherically-shaped periphery formed with an arcuate keyway, a shaft mounted within the housing for oscillation relative thereto, a first bracket securing one of said parts to said shaft, a second bracket secured to the other of said parts and pivotally movable about the spherically-shaped periphery of said housing, a radially movable key pin non-rotatively carried by said second bracket and formed at its inner end with a key engageable with the keyway of said housing to permit initial movement of said second bracket in a plane substantially parallel with the axis of said shaft, and screw means carried by said second bracket and engageable with said key pin for forcing said key into locking engagement with said keyway.

ROBERT J. WOODS.

REFERENCES CITED

The following references are of record in the file of this patent:

UNITED STATES PATENTS

| Number | Name | Date |
| --- | --- | --- |
| 1,341,395 | Sutton | May 25, 1920 |
| 1,797,799 | Shutts | Mar. 24, 1931 |
| 1,833,596 | Sarri | Nov. 24, 1931 |
| 1,881,450 | Fox | Oct. 11, 1932 |
| 1,909,943 | Fox | May 23, 1933 |
| 2,037,819 | Peo | Apr. 21, 1936 |
| 2,043,483 | Peo | June 9, 1936 |
| 2,087,426 | Bechereau et al. | July 20, 1937 |
| 2,094,304 | Salenius | Sept. 28, 1937 |
| 2,229,660 | Magrum | Jan. 28, 1941 |
| 2,385,635 | Maurer | Sept. 25, 1945 |

FOREIGN PATENTS

| Number | Country | Date |
| --- | --- | --- |
| 400,134 | Great Britain | Oct. 19, 1933 |